Jan. 13, 1925.
L. BELL
1,522,853
REFRACTIVE SCREEN
Filed June 15, 1923
2 Sheets-Sheet 1
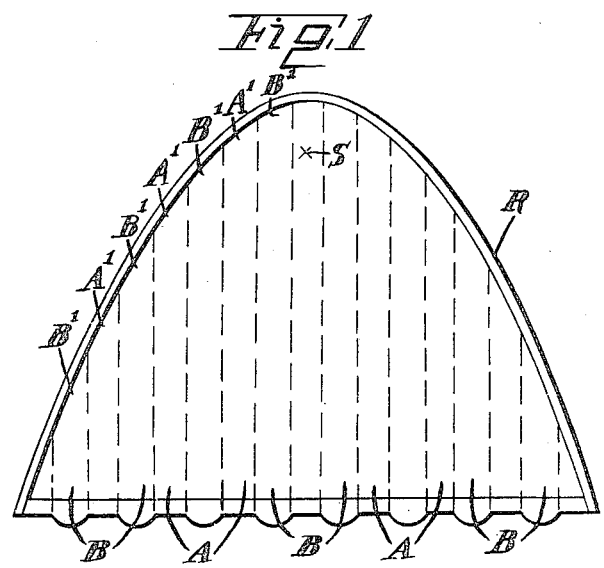
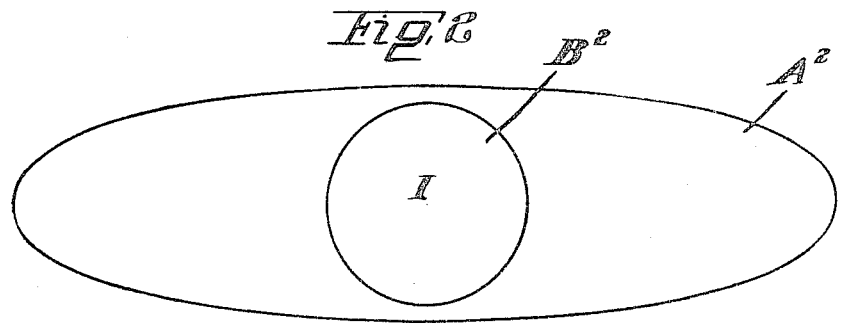
Inventor
Louis Bell
Ellis Spear Jr.
By Attorney

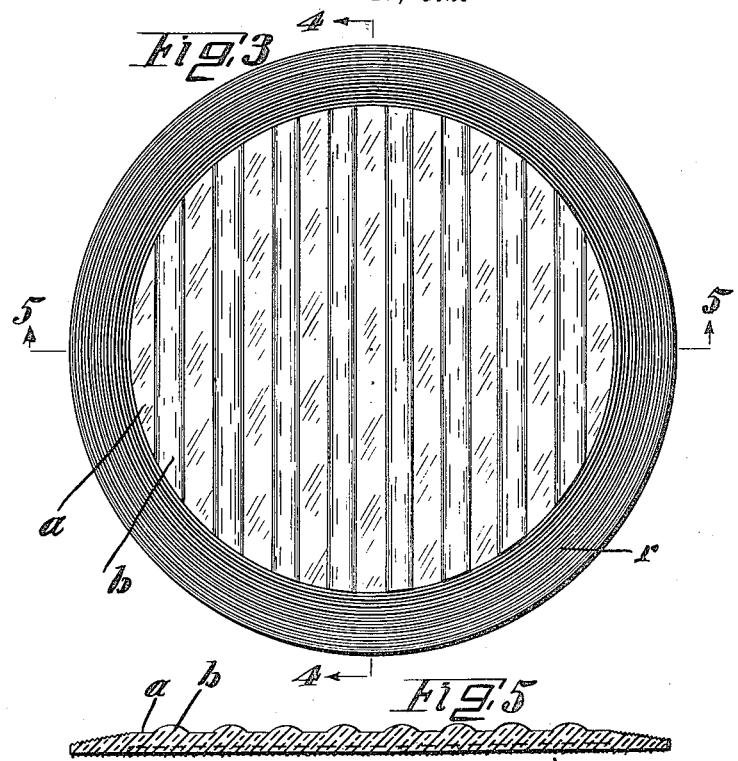
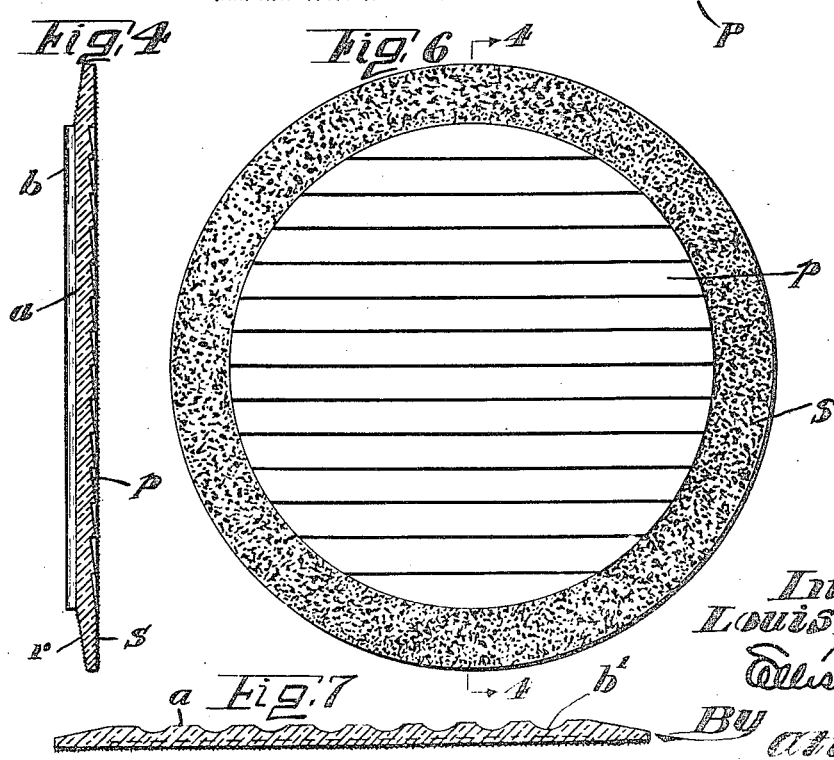

Patented Jan. 13, 1925.

1,522,853

UNITED STATES PATENT OFFICE.

LOUIS BELL, OF WEST NEWTON, MASSACHUSETTS, ASSIGNOR TO EDWARD N. GODING, TRUSTEE, OF NEWTON, MASSACHUSETTS.

REFRACTIVE SCREEN.

Application filed June 15, 1923. Serial No. 645,675.

*To all whom it may concern:*

Be it known that I, LOUIS BELL, a citizen of the United States, residing at West Newton, county of Middlesex, Commonwealth of Massachusetts, have invented certain new and useful Improvements in Refractive Screens, of which the following is a specification.

The art of producing devices to modify in some arbitrary manner the beam of light delivered by an ordinary automobile headlight has progressed chiefly in an entirely empirical manner. As the requirements imposed by the authority of various States have grown more complicated, so also have the lenses themselves developed until the ordinary refractive screen now appears as a somewhat complicated mass of refractive elements often difficult to produce commercially and even so, not fully meeting the desirable requirements for such a screen.

The requirements of certain specified amounts of light at certain points in the vertical intercept to the projected beam have grown more and more exacting so that it is no longer sufficient to tip down the projected beam or to spread it slightly in any convenient way.

These devices have in general followed two methods of attacking the problem. One general method has been to take light from two or more different areas of the reflector, utilizing for example the upper half for laterally spread or diffused light, and the lower half more or less unmodified for the direct illumination or driving beam. The other general method has been to modify the whole beam more or less as by spreading out the edges of the beam or by concentrating light in different portions. These methods have each had their own difficulties, in part being not entirely satisfactory as to result, and in part because they offer manufacturing difficulties or structural defects in the screens designed thereunder.

In accordance with my invention I have devised a lens which though a somewhat radical departure in its manner of attacking the problem makes comparatively easy the designing problem so that almost any required resultant effect may be had in the beam if my invention be followed in designing it.

Inasmuch as there is likely to be ever increasing and more exacting requirements which will doubtless require the redesigning of many standard headlight lenses, it may be helpful to later designers to note the general requirements contemporary with my invention.

The practical requirement of all the specifications for automobile headlighting amounts substantially to this: First, that the whole beam of projected light shall be kept below a line approximately equal to the height of the lamps. Second, that there shall be in the direct line of the vertical axis of the lamps a powerful central driving beam which will illuminate the road for 200 feet or more in front of the car, so that objects will be readily seen. Third, a lateral spread beam is required so as to cover with strong illumination an area 6° or 8° wide, and finally this area must be extended to a total width of some 12° still retaining effective illumination at the side of the road to prevent failure to see obstructions which may lie along the way.

This means there must be an effective central driving beam plus ample light over an area not less than 12° wide and stronger as the center of the area is approached. These general requirements are at this date accompanied by certain specific limitations as to maximum and minimum brilliancy at certain arbitrarily selected points which have been rather generally established by the authorities of different States. These I will discuss more specifically later on in connection with Fig. 2, the present point being that they constitute rather exacting limitations which are liable to be increased and multiplied in the future.

In general my lens contemplates the optical division of the beam from the ordinary commercial parabolic reflector vertically into narrow sections, each reflected from a characteristic narrow section or vertical strip of the parabolic reflecting surface. I distribute each alternate beam section in any well known manner as by refraction. This can be done by ordinary refracting media without the development of striping or shadow effects in the beam if the width of the beam sections be kept narrow enough in relation to the width of the filament of the lamp because such filament is not actually punctiform and is sufficiently extended so that a narrow refracting element will not cast a shadow. With such a conception as a basis, I have factors of great simplicity but of wonderful versatility as will appear in the more detailed description which I will now undertake in connection with the accompanying drawings. In these drawings in which I have been compelled in part to resort to illustrated diagram, Fig. 1 is intended to indicate diagrammatically the beam division and distribution in accordance with my invention viewed in horizontal section of a headlight.

Fig. 2 represents diagrammatically the intercept of such a beam.

Fig. 3 is a front elevation of the lens produced in accordance with my invention.

Fig. 4 is a vertical section through the same.

Fig. 5 is a transverse section through the same.

Fig. 6 is a rear elevation, and

Fig. 7 is a transverse section of a modified form.

In practicing my present invention I provide for the headlight or projector a screen or lens, so called, having a cooperating relation with the reflector so its reflected beam will be vertically zoned in narrow strips or bands.

I have indicated in Fig. 1 a series of such zonings as at A and B. In the form shown these alternate and are of about equal width but this is merely illustrative and the resultant driving beam can be modified by otherwise dividing and distributing the zones. These zones emanate as it were from corresponding narrow areas of the reflector R and indicated in Fig. 1 as $A^1 B^1 A^1$.

The actual division and control of the beam is preferably accomplished by a screen or lens of which an illustrative form is shown in Fig. 3.

This screen comprises a glass plate having its front face formed as shown in Fig. 3 with an alternate series of surfaces $a$, $b$ which preferably alternate between a flat or plane surface and a curved or slightly cylindrical surface. This cylindricity may be positive as shown in Fig. 4 or negative as indicated at $b^1$ in Fig. 7 in which the curved refracting surfaces are formed as shallow vertical grooves. On the opposite side the plate is divided preferably into a series of uniform downward refracting prisms $p$. The front face of the lens has about its margin a circumferential roughening $r$ and on its rear face in the corresponding zone a stippled surface in accordance with my prior Letters Patent No. 1,456.585, dated May 29, 1923. The refracting surfaces $b$ or $b^1$ are of relatively low curvature, this being proportioned to the narrowness of the zones used and for the amount of distribution required.

I find in practice that a convenient form may be had by making the zone spaces of about one-half inch in width and in uniformly alternating the zones $a$, $b$ so that about one-half of the beam constitutes a driving beam as indicating by the circular area $B^2$ in Fig. 2, while the other half is dispersed so as to be laterally spread, forming a somewhat elliptical intercept roughly indicated by the oval area $A^2$. For a one-half inch space and a radius of curvature of one inch the extreme refractive angle will be substantially $14\frac{1}{2}°$. For glass of ordinary index of refraction this gives a little over $7°$ extreme angle of refractions. The relative width of the relatively refractive and non-refractive portions determines the intensity ratio. The ratio between the width of refractive portion and the radius of curvature determines the extremity of spread of the lateral refracted beam. The curvature of the refracting surface whether circular or non-circular determines the distribution of the lateral refracted light within the area of illumination. In a similar way the refractive angle and the deflection and proportional amount of light for any other lateral element of the refracting body can be ascertained always subject to the provision that the spread is slightly increased by the physical dimensions of the source of light, whereby the rays incident on any point of the refractive body are not accurately parallel.

The downward refracting prisms $p$ may be uniform or otherwise, but their potential uniformity is of great advantage in manufacture and when combined with my system of distribution on the front of the lens gives a very highly efficient road illumination.

The character of the front face of my lens also lends itself to economical production and easy and inexpensive preparation of moulds.

Various modifications as above indicated and otherwise, obviously within the terms of my claims may be made without departing from the spirit of my invention.

What I therefore claim and desire to secure by Letters Patent is:

1. A headlight for projecting a central concentrated beam of light and a laterally spread substantially elliptical beam, comprising a reflector and a light source for producing parallel rays, and a lens covering the mouth of the reflector and having on one face thereof a plurality of narrow, vertical, substantially cylindrical and plane strips or surfaces alternately arranged with relation to each other, the plane strips or surfaces allowing the parallel rays to pass therethrough unmodified so as to produce the central concentrated beam and the substantially cylindrical strips or surfaces spreading the parallel rays laterally to produce the substantially elliptical beam.

2. A headlight for projecting a central concentrated beam of light and a laterally spread substantially elliptical beam, comprising a reflector and a light source for producing parallel rays, and a lens covering the mouth of the reflector and having on one face thereof a plurality of narrow, vertical, substantially cylindrical and plane strips or surfaces alternately arranged with relation to each other, the plane strips or surfaces allowing the parallel rays to pass therethrough unmodified so as to produce the central concentrated beam and the substantially cylindrical strips or surfaces spreading the parallel rays laterally to produce the substantially elliptical beam, and said lens having on its opposite face a plurality of transverse depressor prisms for depressing both the spread and the concentrating beams of light.

3. A unitary headlight lens comprising a plate having on one face thereof two groups of narrow vertical strips, one group having substantially cylindrical surfaces to spread laterally the light passing therethrough, and the second group having plane surfaces to allow the passage of light unmodified in horizontal planes, the strips of said groups being arranged alternately with relation to each other, said plate having on its opposite face a plurality of transverse depressor prisms to deflect light downwardly, and one of the faces of said plate adjacent the periphery thereof formed with an annular light diffusive surface.

In testimony I affix my signature in presence of two witnesses.

LOUIS BELL.

Witnesses:
WALTER G. WOLFE,
FRANCIS D. SHENK.